Figure 1:
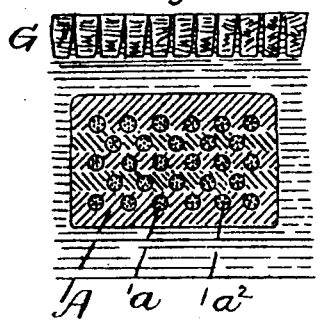

(No Model.) 3 Sheets—Sheet 1.

T. N. VAIL.
SUBTERRANEAN SYSTEM OF ELECTRICAL CONDUCTORS.

No. 262,630. Patented Aug. 15, 1882.

Witnesses. Inventor.

(No Model.) 3 Sheets—Sheet 2.
T. N. VAIL.
SUBTERRANEAN SYSTEM OF ELECTRICAL CONDUCTORS.
No. 262,630. Patented Aug. 15, 1882.
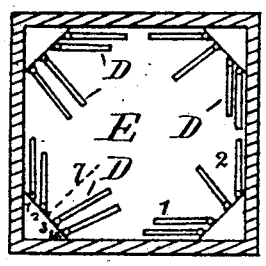
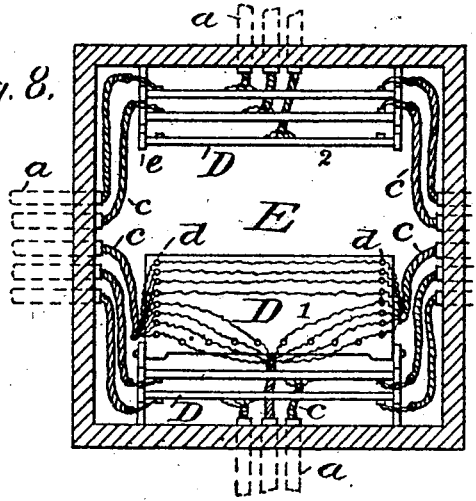
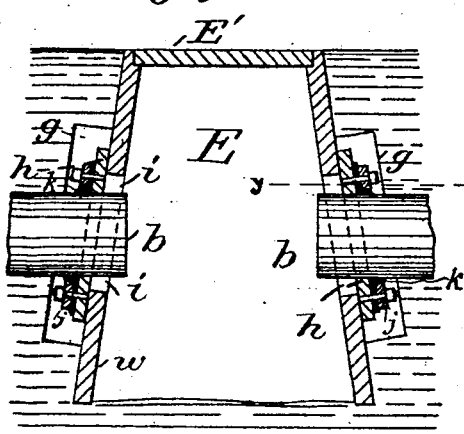
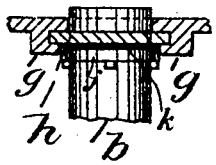
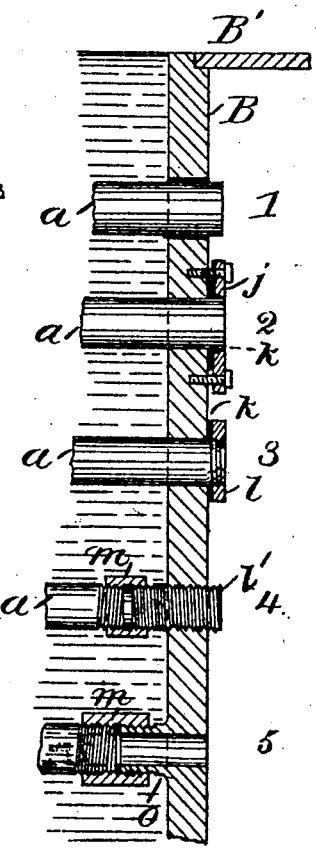
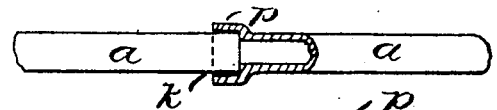
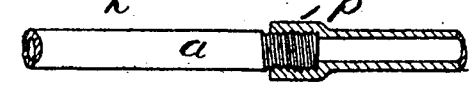
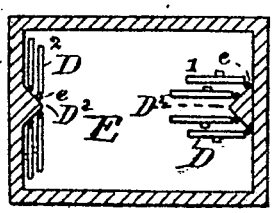

(No Model.) 3 Sheets—Sheet 3.
T. N. VAIL.
SUBTERRANEAN SYSTEM OF ELECTRICAL CONDUCTORS.
No. 262,630. Patented Aug. 15, 1882.
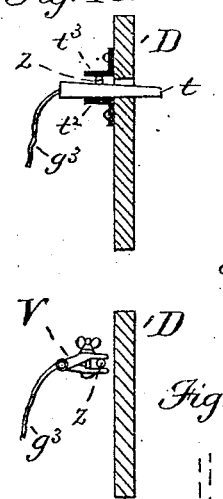
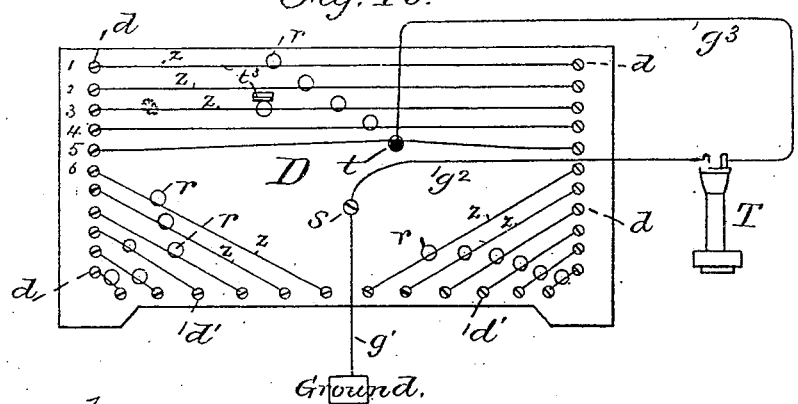
Fig. 15ᵃ.
Fig. 15.
Fig. 15ᵇ.
Fig. 16.
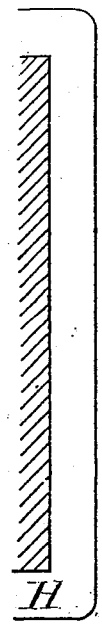
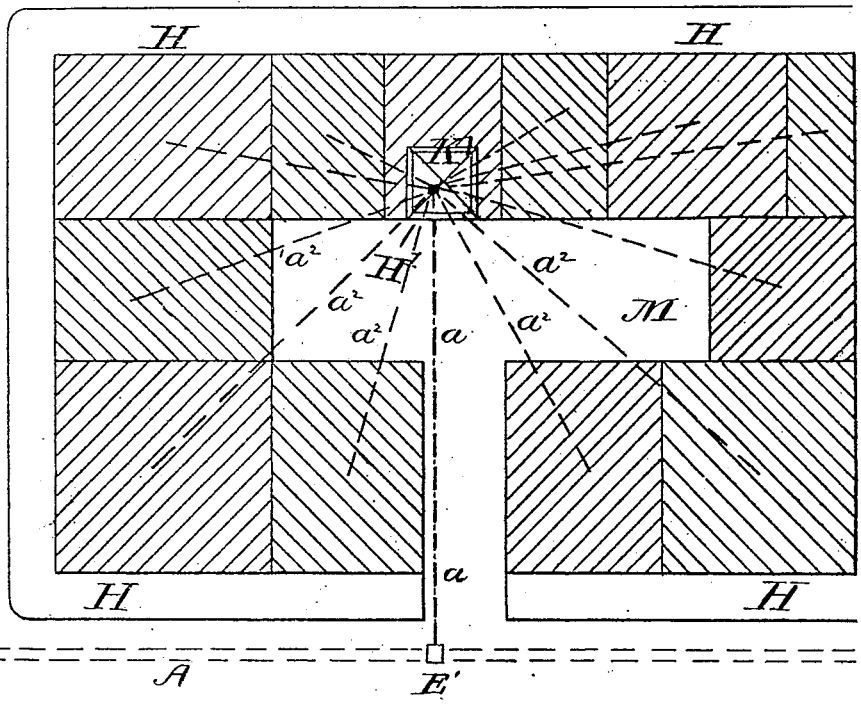
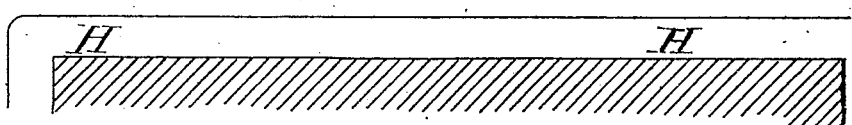
Witnesses. Fig. 15ᶜ. Inventor.
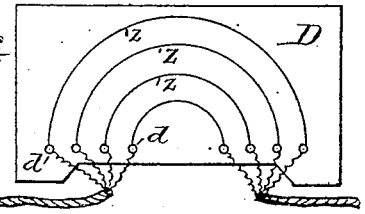

UNITED STATES PATENT OFFICE.

THEODORE N. VAIL, OF BOSTON, MASSACHUSETTS.

SUBTERRANEAN SYSTEM OF ELECTRICAL CONDUCTORS.

SPECIFICATION forming part of Letters Patent No. 262,630, dated August 15, 1882.

Application filed November 2, 1881. (No model.)

*To all whom it may concern:*

Be it known that I, THEODORE N. VAIL, of Boston, in the county of Suffolk and State of Massachusetts, have invented certain Improvements in a Subterranean System of Electrical Conductors, of which the following is a specification.

My invention relates to underground wires for electrical systems of communication and to improved methods of laying them.

The objects of my improvements are as follows: first, to provide for use in cities and other large and concentrated settlements of population a suitable system of underground lines for electrical purposes, connected at suitable intervals by means of test-boxes or chambers, wherein the work of connecting, interchanging, repairing, and testing the wires can be easily and rapidly accomplished without any extended interruption of the traffic through the streets beneath which the lines are laid; second, to construct the trenches and tubes or pipes through which the wires (cabled or loosely bunched) are drawn, their testing-chambers, and the joints or connections between them in such a manner that they will be properly protected from injury by reason of moisture or by the settling of either the test-box or conveying-tubes; third, to provide a mode of easy access to any particular wire; fourth, to so arrange the wires in the test-boxes that suitable testing-instruments may be attached quickly and effectually; and, fifth, to provide means and appliances whereby the wires may from any designated point be distributed readily, economically, and feasibly to any number of termini. These objects are all attained by the improved appliances, devices, and methods of construction illustrated in the accompanying drawings, and hereinafter fully set forth and described in the subject-matter of this specification.

My invention consists in laying a number of tubes or pipes in a mass of supporting and preservative material placed in a conduit or trench excavated in the earth, in the combination of the said tubes and wires with testing-chambers, of testing or connection boards placed in the said chambers, and of special methods of constructing and arranging such boards, so that access may readily be had to any wire.

It consists, further, in devices adapted to protect the pipes from injury at the test-box joints arising from the settling of test-boxes or chambers, in air and water-tight joints for the pipes at their entrance into the said chambers, of appliances for the connection of testing instruments, and in an improved method of distributing the various conducting-wires to their terminating points.

Figure 3:
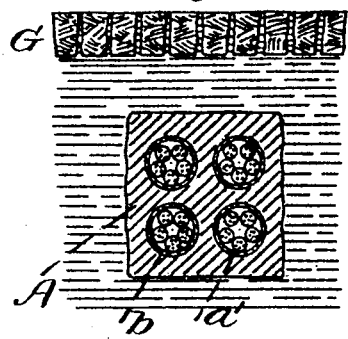
Figure 2:
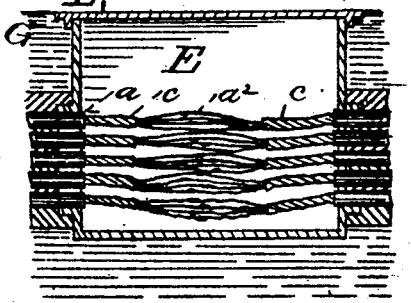
Figure 4:
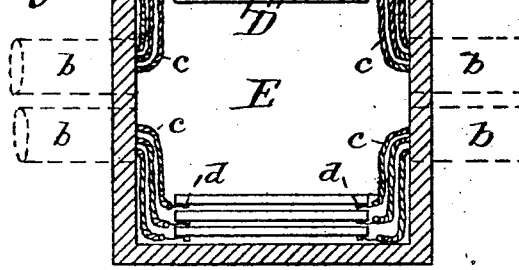
Figure 6:
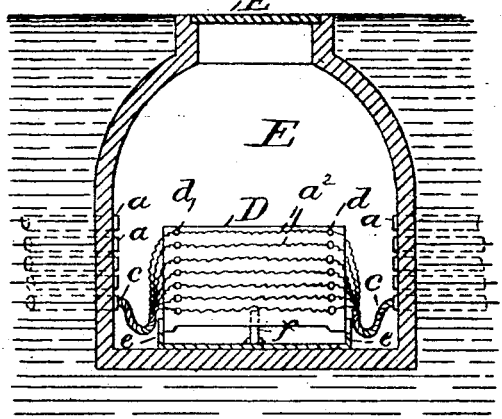
Figure 5:
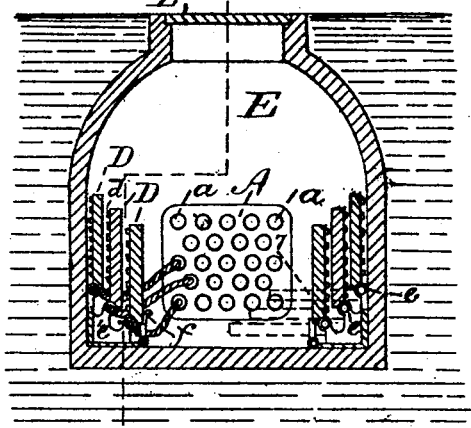
Figure 7:
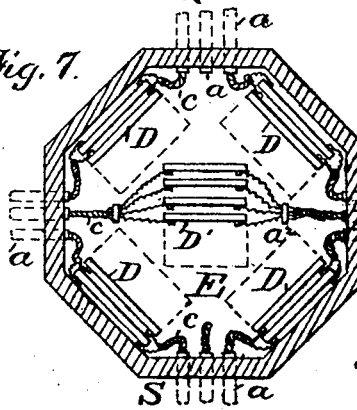

In the accompanying drawings, which fully illustrate my invention and its methods of application, Figure 1 is a transverse section of my improved system of subterranean conductors, where a number of small tubes are embedded in a protecting-cement and contain insulated conducting-wires. Fig. 2 is a longitudinal section of a testing-chamber, showing the concrete casing brought close to its exterior, with the tubes only entering, and the several conducting-wires of one section connected directly to the corresponding wires of the next section, without any intermediate connections; Fig. 3, a transverse section, showing large wire-containing tubes embedded in a concrete mass, as in Fig. 1; Fig. 4, a horizontal section of a testing-chamber, looking down. Fig. 5 is a cross-section of a similar test-chamber, showing the testing-boards ranged in front of one another, and the entrance of the tubes at one side. Fig. 6 is a section on the line $x\ x$ of Fig. 5, and Fig. 7 is a horizontal section of a modification of a testing-chamber. In Sheet 2, Fig. 8 is a horizontal section, looking down, showing one of the test-boards swung over for the purpose of making or changing connections, and also shows wires entering from four directions. Figs. 8ª and 8ᵇ represent different methods of arranging the folding connecting-boards, and Figs. 8ᶜ and 15ᶜ show other ways of arranging the binding-screws and connecting-wires thereon. Fig. 9 is a longitudinal section of a testing-vault, illustrating my improved method of preventing any evil results from the settling of the ground; Fig. 10, a section on the line $y\ y$ of Fig. 9. Fig. 11 illustrates several different methods of packing the tubes as they enter the vaults or test-chambers. Figs. 12, 13, and 14 illustrate several methods of making joints in small pipes. In Sheet 3, Fig. 15 shows one of the swinging test-boards arranged with testing facilities, the instrumentshown being a telephone, while Figs. 15ª and 15ᵇ represent other modes of attaching the testing device; and Fig. 16 shows a block of houses inclosing an area, and a method of conducting the wires from the nearest testing-box to the said area, and from thence to the roof of one of the houses surrounding the said area for distribution to the respective terminal points.

It will be observed that Figs. 4, 5, 6, 7, 8, 8ª, 8ᵇ, 8ᶜ, and 15ᶜ all relate to and illustrate the arrangement and action of the swinging testing-boards in the vault or chamber.

Referring now to the above drawings, my invention may be described as follows:

A is the main casing of the wires, and is preferably constructed by excavating a trench of the required dimensions and covering the bottom of the same with bitumen, asphalt, pitch, concrete, or any suitable cement which is fluid or plastic or pliable when put in place, and hardens and remains solid under ordinary temperature. Upon the floor of the material thus provided is placed a layer of small tubes, $a$, as shown in Fig. 1, or larger tubes, as in Fig. 3. Over the layer of pipes or tubes another layer of such material or cement is placed, then another layer of tubes, and so on until a sufficient number of tubes are laid for the proper accommodation of the district. The whole is then covered with a thick layer of the said material or cement and covered with earth; or I may lay the pipes, supported by frames in the trench, in several layers, all parallel to but not touching one another, and embed them in the material, (which may or may not be of nonconducting character,) while it is in a soft or plastic state, by pouring it over, under, and between the pipes. When cold or set it will form a casing round them impervious to moisture.

The tubes or pipes employed may be extended longitudinally to any distance, the several lengths being connected one to another in the usual manner before the pipes are surrounded by the protecting-cement. These tubes may be either metallic or vitreous.

I have shown in Figs. 12, 13, and 14 different methods of connecting the lengths of pipe one to another. Fig. 12 shows a joint in which the ends of the pipes $a$ to be joined are provided respectively with a right and left screw, both fitting into a sleeve-coupling, $m$, adapted to simultaneously connect both of the ends. Fig. 13 shows one of the pipe ends, $p$, flaring for the reception of its corresponding pipe. When the tubes are put together the joint is packed at $k$ with yarn or other fibrous material. Fig. 14 shows one of the pipe ends fitted with a male screw and the other with a female screw. Any or all of these methods of connection may be adopted, as found advisable.

At suitable distances apart I provide testing boxes or chambers, which may be made of iron, built of brick, or of wood. These chambers may be of any required size, and while in the majority of cases I prefer to construct them sufficiently large to admit of the ingress of a workman, and to allow him a convenient space for movement, I may, where required, reduce them to such small dimensions as to permit of the performance of any necessary manipulations by a person, kneeling or stooping upon the surface of the ground. As each pipe is laid in its place an iron wire is threaded completely through it from one test-chamber to another, so that by its use the cable or group of conducting-wires may be pulled in. The size of the pipes laid will of course vary according to the number of wires likely to be wanted on any special route, but in no case should be smaller than one inch or larger than six inches. Fig. 1 shows a number of pipes, $a$, of the former size, filled with insulated wires $a^2$ and embedded in the cement A. In Fig. 3 the pipes $b$ used are much larger and suited for the reception of cables or multiple conductors $a'$. Ordinarily the pipes only are led into the test-boxes E; but should circumstances render it desirable the casing of concrete, A, may also be led into the test-box, as shown in Fig. 5; and when this is done the walls of the test-boxes would be built round the said casing. In nearly all the figures I have shown the cement casing A terminating immediately at the exterior of the wall of the test-box E, while the tubes $a$ enter the chamber, and this construction I prefer.

To prevent the ingress of moisture, drainage, and extraneous matter of any character, I provide a suitable packing around each tube at the point at which it enters the vault. Different methods are shown in Fig. 11. The construction marked No. 1 shows a space left in the wall B of the chamber surrounding the tubes $a$, which space is packed with yarn or hemp packing and calked. No. 2 shows the entering end of the tube surrounded by an elastic washer, $k$, which is compressed by a bolt-fastened gland, $j$. Nos. 3, 4, and 5 show other methods of connection, all tending to the same end. No. 3 shows an elastic washer, $k$, compressed between the wall and a nut, $l$, screwed on the end of the tube. In No. 4 a short tube, $l'$, is tapped into the wall, an elastic washer is placed between the ends of the tube $l'$ and tube $a$, and a collar provided at the ends with interior right and left threads which engage the threads on the tubes $a$ $l'$, respectively, and connect and hold together said tubes. No. 5 is the same as No. 4, except that in place of the short tube $l'$ there is a hollow screw-threaded projection, $o$, in one piece with the wall. The pipes in this system should be carefully scraped, so as to form an approximately smooth surface and prevent ebrasion of the covering of the wires when the latter are drawn in. The conducting-wires should be of copper, although iron or any other suitable metal may be used, and in practice I prefer to employ the ordinary cotton-covered wire, generally known as "office-wire." I may use these or any other covered wires loosely bunched and tied together; or I may, where found preferable, use cables containing a number of wires. The conducting-wires, cut into lengths, are in construction drawn through from the working-chamber at one end of a section to the chamber at the other by means of the iron wire which is laid down with the tubes.

For the proper connection of the separate lengths of conducting-wire to one another, as also to provide a convenient means of access to the points of connection for the purposes of interchange of wires, repairs, and testing, I arrange within each testing-chamber one or more sets of test-boards D, as shown in the drawings. In Figs. 4, 5, 6, 7, 8, 8ª and 8ᵇ I have shown the manner in which I range these folding connecting-boards. They are to be hinged by a flap-hinge or pivot-hinge, or any other well-known form of hinge, as shown at points 1, 2, 3, and 4 in Fig. 8ᵇ or 8ª, which illustrate the boards when hung on the vertical side of the vault; or they may, if required, in circumstances hereinafter indicated, be hinged to a bracket fixed to the bottom or floor of the chamber, as shown in Figs. 5, 6, and 8. By hinging them as shown the boards can swing over into the position indicated by 1 in Figs. 8 and 8ᵇ, or into the position indicated by the small figure 2 in the same figures, and as is readily seen by the diagram each of them can swing in either direction without interfering with those behind or under them, and can by this manner of mounting be swung out of the way. This is effectuated by placing the axes of the several sets of hinges along a line which is substantially at right angles to the line shown as a dotted line, 7, which in the two figures, 5 and 8ᵇ, bisects the angle formed by the two extreme positions of the leaf at 1 and 2. If, now, a cable be brought, as shown in the figures, either to the line of the axis of the hinge turning onto the board, which may be conveniently cut away for the easier manipulation of the wire, as shown in Fig. 8ᶜ, 15ᶜ, or 15, or to the end of the board, as shown in these or other figures, the wires from the cable or group of conductors may be spread out in the fan shape and carried to the board. As the board then swings on its hinges, the wires will bend with it without injury and will not be torn away, whereas if the attempt were made to connect them with the opposite or free edge of the board 3 and 4 in Fig. 8ᶜ it would be so inconvenient as to be practically impossible to swing the boards from one position to the other.

It is obvious, as hereinbefore indicated, that the axes around which these folding boards swing may be either vertical or horizontal, as shall be most convenient. If the box is a very large one, it may be convenient to arrange these axes perpendicularly, so that a man can get into the box and swing them about at his convenience. If it be a smaller one, it will be more convenient to make it horizontal, so that a man kneeling on the ground outside the box can reach his arm in and expose and work at whichever board he desires. The distance apart from one axis to the other along the line 1 2 3 4 should be from once and a half to twice the total thickness occupied by each leaf, in order to give room for them to swing without interfering with each other; and as the surface of the leaf will be studded with connecting screws and wires I prefer abutments or separating-blocks to be fastened to each leaf and bear against the next one, as shown in Fig. 8ª, so as to protect the wires and other attachments from injury. In this case, also, the wires may be held in a firm support on the line of the axis, and swinging the connecting-board will simply cause them to bend without tearing away or producing contusion.

My invention contemplates therefore that the wires shall be brought to such a folding board either along the hinge side or along the two ends of the board, and when the wires emerging from the tubes are thus brought near to the hinge edge or to the ends of the board they are there attached to convenient binding-screws. These binding-screws may be permanently connected in any way that it is desired. For example, permanent connections may be made to run the length of the board; or they may be made to connect the end wires with the side wires; or they may be made to connect one set of side wires with another set of side wires, as may be most desirable or convenient in any particular case.

In this system of electrical conductors it is desirable to be able to readily test any wire at each box, and for that purpose it is convenient to be able to attach a telephone or other testing-instrument by connecting it into or attaching it to the circuit at any wire inside each box. It would of course be possible to interpose in the wire permanently attached to the board a spring-jack or other well-known contrivance of that character by which a testing-instrument could be plugged into the line; but all the contrivances known for that purpose are more elaborate and expensive than is needed for an apparatus which will be used but seldom. I have therefore devised a cheap contrivance which is sufficient for this purpose. In Figs 15, 15ª, and 15ᵇ I show several such contrivances. In Fig. 15 the permanent wires shown are strained from screws at one end of the board to the other. Underneath the wire a hole is bored through so that its center will be a little way from the line of wire. Upon plugging into that hole a little plug connected with a telephone, as shown in Fig. 15, the wire which is strained between the two screws is deflected from its true line, and its elasticity creates pressure enough on the surface of the metal plug to make a good electrical contact. If desired, an abutment with insulating facing (or the whole abutment may be made of wood) can be placed slightly on one side of the wire, and the whole made as shown in Fig. 15ª or at $t^3$, Fig. 15. In that case, when the metallic plug is put in, the contact-pressure on the wire is obtained not merely by its own elasticity, but by squeezing it or wedging it against the non-conducting abutment $t^3$. In this case there is less strain on the wire and less necessity for keeping it tightly stretched. It is also practicable to attach a screw-vise to the telephone-cord, and with that to nip the connecting-wire.

If the connecting-wires are covered with kerite or other convenient insulator, it will be necessary to scrape it away for a small distance at the place where the telephone-connection is to be made.

Each testing box, vault, or chamber is provided with a suitable lid or cover, E', which should fit tightly, so as to prevent any moisture from obtaining ingress, as I conceive the exclusion of moisture one of the chief objects of my invention, inasmuch as by the achievement of such exclusion I may dispense with a high degree of insulation upon the conducting-wires, and am enabled to employ ordinary cotton covered wires.

To prevent the possibility of damage or injury to the tubes or conducting-wires or test-boxes arising from the settling of the earth under and around my appliances, I provide a slide-joint, which is shown in Figs. 9 and 10. The chamber illustrated in Fig. 9 is constructed of wood, with apertures $i$ through which the pipes $b$ enter.

Attached perpendicularly to the external surface of the walls of the vault are two rabbeted cleats, $g\ g$, (see Fig. 10,) while surrounding the pipe $b$ and sliding in the rabbets of said cleats and on the face of the wall $w$ is a flat plate or collar or valve, $h$, through which the pipe $b$ projects into the chamber. The packing $k$ is applied to the pipe $b$ in the form of a washer, and is held in place by means of a rigid washer, $j$, bolted to piece $h$, the inner edge of washer $j$ being beveled, as shown in Fig. 9, to press the packing more closely against pipe $b$, making a tight joint.

It is evident that such a construction obviates any evil result which might be expected to accrue from settling of the ground, since whenever the test-box or tube becomes depressed the valve $h$ has sufficient lap over the aperture $i$ to prevent the access of foreign and obnoxious matter, and as the pipe $b$ is not rigidly attached to the walls of the chamber and has sufficient scope of movement in the entering-aperture either pipe or chamber may sink considerably without causing a violent strain. Thus the possibility of any injury arising from this cause is greatly diminished.

A simple and practical method of bringing the conducting-wires from their subterranean bed to any desired point is shown in Fig. 16. H H represent buildings facing several streets. M is an area in the rear of a block of such buildings. K is a cupola or central testing or connection box upon the roof of one of the houses in the block. E is a test-box such as hereinbefore described, from which tubes containing wires radiate. One of these tube-lines leads off to the auxiliary test-box E', from which it is led beneath the pavement to the inclosed area M, and there protected in any suitable manner—as, for example, inclosed in lead pipe, $a$. The wires emerge from the ground and are led up the side of the building to the cupola or test-box K', where they are separated one from another and diverge to the different houses in the block, as shown by the dotted lines $a^2$.

The connection-board and other apparatus described are to be used in the aerial testing-box, so far as they are applicable, and they may also be used in a test-box upon the surface of the ground, where such a construction is necessary or desirable, the box being of course provided with a suitable door and lock to prevent unauthorized admission. Underground conductors can be connected with such surface-box by suitable bends.

Having now described my invention, I claim—

1. In a system of subterranean electrical conductors, the combination of a series of tubes embedded in a suitable protective material, and containing insulated wires, with a series of test boxes or chambers connecting the different sections of the said tubes, and containing connection-boards provided with individual binding-screws connected together in pairs by conductors attached to said boards, as described, whereby the conducting-wires entering the said testing-chambers from different directions are connected together to form continuous lines of communication, as and for the purpose specified.

2. In a system of underground electrical conducting-wires, a testing box, chamber, or vault combined with a testing or connecting board or boards fitted with binding-screws, and adapted to act as an intermediate connector between different wires entering the said chamber, the said boards being hinged and adapted to swing on their axes, and thereby assume any desired position, substantially as specified.

3. A connection-board hinged or pivoted to its supports, and provided with binding-screws, substantially as and for the purpose described.

4. In the herein-described system of underground electrical conductors, a series of testing or connecting boards placed in a flush-box, testing chamber, or vault, and ranged in front of one another, as described, each board being hinged separately at its edge to a stationary bracket, the several hinges being successively ranged in different planes, as and for the purpose specified.

5. The combination, with a stationary bracket, post, or jaw, of a series of testing-boards hinged thereto at different successive and proportionate distances from the central line of the said bracket, substantially as described.

6. In a system of underground electrical conducting or testing chambers or vaults, a testing or connecting board hinged to a fixed axis to admit of being swung in either direction, arranged in the said testing-chambers, and by means of binding-screws symmetrically attached thereon and short conducting-wires extending over its surface adapted to connect the wires entering the said chamber from one direction to the wires entering from other directions, and means, substantially as indicated, for the attachment of testing devices to any wire arranged thereon.

7. In a system of subterranean tubes and testing-chambers connecting the different sections of the same, the combination, with a testing-chamber and tube, of the elastic packing material placed in position at the end of the tube, a gland for compressing the same, and the screws whereby the said gland is attached, or their equivalent, substantially as described.

8. The combination, with an underground testing-chamber and tube entering the same, of the slide joint between the said tube and the wall of said chamber, substantially as described.

9. In a test-box, and in combination with the conductors entering said box and the wires connecting and completing the circuits of said conductors, a branch testing-circuit and means, as indicated, for electrically connecting the branch circuit with any one of said connecting-wires without breaking their connection with their respective conductors, substantially as described.

10. The combination, with a connection-board having a series of wires led over its surface, and abutments adjacent to said wires, of a flexible conducting-cord connected with a testing-circuit, and a plug or wedge for making contact with any one of said wires by wedging the wire between itself and the adjacent abutment, substantially as described.

11. A connection-board having electrical line-wires carried over its surface, connected by binding-screws, in combination with testing apparatus and devices for connecting the same to the said line-wires, consisting of a telephone one terminal of which is connected to the ground and the other to a plug or wedge, a hole perforated in the testing-board under each wire for the insertion of the said wedge, and an abutment of non-conducting material, $t^3$, against which the wire to be tested is pressed to insure a good electrical connection, as described.

In testimony whereof I have signed my name to this specification, in the presence of two subscribing witnesses, this 31st day of October, 1881.

THEO. N. VAIL.

Witnesses:
GEO. L. PHILLIPS,
GEO. W. PIERCE.